US008175146B2

(12) United States Patent
Nam et al.

(10) Patent No.: US 8,175,146 B2
(45) Date of Patent: May 8, 2012

(54) DISPLAY APPARATUS HAVING DATA COMPENSATING CIRCUIT

(75) Inventors: Hyoung-Sik Nam, Incheon-si (KR); Dong-Won Park, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 1376 days.

(21) Appl. No.: 11/757,156

(22) Filed: Jun. 1, 2007

(65) Prior Publication Data
US 2007/0285371 A1    Dec. 13, 2007

(30) Foreign Application Priority Data

Jun. 12, 2006   (KR) ........................ 10-2006-0052607
Aug. 3, 2006    (KR) ........................ 10-2006-0073457

(51) Int. Cl.
*H04N 7/12* (2006.01)
(52) U.S. Cl. ...................... 375/240.01; 345/98
(58) Field of Classification Search .............. 375/240.01
See application file for complete search history.

(56) References Cited

U.S. PATENT DOCUMENTS

| | | | | |
|---|---|---|---|---|
| 5,313,298 | A * | 5/1994 | Meeker | 375/240.01 |
| 5,539,452 | A * | 7/1996 | Bush et al. | 348/14.13 |
| 6,252,991 | B1 * | 6/2001 | Uchio et al. | 382/236 |
| 7,075,993 | B2 * | 7/2006 | O'Brien, Jr. | 375/240.27 |
| 7,095,783 | B1 * | 8/2006 | Sotheran et al. | 375/240.01 |
| 7,295,608 | B2 * | 11/2007 | Reynolds et al. | 375/240.01 |
| 7,415,162 | B2 * | 8/2008 | Suzuki et al. | 382/246 |
| 7,515,634 | B2 * | 4/2009 | Chang | 375/240.12 |
| 7,760,808 | B2 * | 7/2010 | Luo et al. | 375/240.2 |
| 2002/0136304 | A1 * | 9/2002 | Akhan et al. | 375/240.16 |

FOREIGN PATENT DOCUMENTS

JP    2005-309326    11/2005

OTHER PUBLICATIONS

Cheng, Chih-Chi. Tseng, Po-Chih. Huang, Chao-Tsun. Chen, Liang-Gee. Multi-Mode Embedded Compression Codec Engine for Power-Aware Video Coding System. IEEE Workshop on Signal Processing Systems Design and Implementation. Pub. Date: Nov. 2005. Relevant pp. 532-537. IEEE Xplore: http://ieeexplore.ieee.org/stamp/stamp.jsp?tp=&arnumber=1579925.*
English Language Abstract, JP Patent First Publication No. 2005-309326, Nov. 4, 2005, 1 page.

* cited by examiner

*Primary Examiner* — Nathan Flynn
*Assistant Examiner* — Jeremiah Avery
(74) *Attorney, Agent, or Firm* — Innovation Counsel LLP

(57) ABSTRACT

In a data compensating circuit and a display apparatus having the same, a previous compressed data compressed from a previous frame data is previously stored in a memory, a decoder decompresses the previous compressed data from the memory to output a previous decompressed data, a coder-decoder compresses a present frame data into a present compressed data to store the present compressed data in the memory and decompresses the present compressed data to output a present decompressed data. A first processor outputs a difference value between the previous decompressed data and the present decompressed data, a second processor adds the present frame data and the difference value to generate a previous re-decompressed data. A compensator outputs a present compensation data based on the previous re-decompressed data and the present frame data. Thus, the size of the memory may be reduced while preventing damage of data.

30 Claims, 7 Drawing Sheets

DISPLAY APPARATUS HAVING DATA COMPENSATING CIRCUIT

CROSS-REFERENCE TO RELATED APPLICATION

This application relies for priorities upon Korean Patent Applications Nos. 2006-52607 filed on Jun. 12, 2006 and 2006-73457 filed on Aug. 3, 2006, the contents of which are herein incorporated by references in their entireties.

BACKGROUND OF THE INVENTION

1. Field of the Invention

The present invention relates to a display apparatus and, more particularly, to a display apparatus having a data compensating circuit capable of preventing damage of data.

2. Description of the Related Art

In general, a liquid crystal display (LCD) includes two display substrates and a liquid crystal layer interposed between the substrates. The LCD applies an electric field to the liquid crystal layer to control the transmittance of light passing through the liquid crystal layer by adjusting intensity of the electric field, thereby displaying desired images.

Recently, the LCD has been widely used as a display apparatus to display moving images for computers, television sets or the like. However, a conventional LCD is not suitable for displaying the moving images since the response speed of the liquid crystal is slow.

The slow response speed of the liquid crystal molecules is due to the time required to charge the liquid crystal capacitor to sufficient voltage to obtain the desired display brightness. Especially, when the voltage difference between a previous voltage charged into a liquid crystal capacitor and the target voltage is large, the liquid crystal capacitor is not charged to the target voltage during a 1H period when the switching element is turned on. This is so even if the target voltage is applied to the capacitor from the beginning of the 1H period.

To avoid this problem, a conventional LCD employs a dynamic capacitance compensation (DCC) method in order to speed-up the response speed of the liquid crystal. According to the DCC method, a compensation voltage is applied to pixels during a present frame based on the target voltage of the present frame and the previous voltage of the previous frame in order to speed-up the response speed of the liquid crystal.

However, additional frame memories are necessary in the conventional LCD employing the DCC method to store the previous voltage of the previous frame. As a result, the productivity of the LCD is degraded and the cost of manufacture increases due to the number and size of the frame memories.

SUMMARY OF THE INVENTION

The present invention provides a data compensating circuit capable of improving productivity thereof by reducing a memory size and preventing damage of data.

The present invention also provides a display apparatus having the above data compensating circuit.

In one aspect of the present invention, a data compensating circuit includes a memory, a decoder, a coder-decoder, a first processor, a second processor and a compensator. The memory stores data compressed from a previous frame and the decoder decompresses the previously compressed data that is read out from the memory during the present frame. The coder-decoder compresses present frame data and stores the present compressed data in the memory and decompresses the present compressed data to output decompressed data during the present frame.

The first processor outputs a first difference value indicating the difference between the previous decompressed data and the present decompressed data, and the second processor outputs a previous re-decompressed data based on the first difference value and the present frame data. The compensator compensates the present frame data based on the previous re-decompressed data and the present frame data to output a present compensation data.

In another aspect of the present invention, a data compensating circuit includes a first memory, a second memory, a coder, a comparator, a decoder, a compensator and a data selector.

In the first memory, (n−2)th compressed data from an (n−2)th frame data (where n represents the present frame) is previously stored and an (n−1)th compressed data from an (n−1)th frame data is previously stored in the second memory. The coder converts n-th frame data into n-th compressed data during the n-th frame, and the comparator compares the (n−2)th compressed data, the (n−1)th compressed data and the n-th compressed data with each other to output a selection signal.

The decoder decompresses the n-th compressed data, the (n−1)th compressed data and the (n−2)th compressed data into an n-th decompressed data, an (n−1)th decompressed data and an (n−2)th decompressed data, respectively. The compensator outputs a first compensation data based on the (n−1)th decompressed data and the (n−2)th decompressed data, and the data selector outputs either the n-th frame data or the first compensation data as output data in response to the selection signal.

In a further aspect of the present invention, a display apparatus includes a first memory, a second memory, a first decoder, a second decoder, a coder-decoder, a first processor, a second processor, a third processor, a fourth processor and a compensator. The first memory stores (n−2)th compressed data from an (n−2)th frame data during the (n−1)th frame, outputs the previously stored (n−2)th compressed data during the n-th frame, and stores (n−1)th compressed data from the (n−1)th frame data. The second memory stores the (n−1)th compressed data during the (n−1)th frame and outputs the previously stored (n−1)th compressed data during the n-th frame.

The first decoder decompresses the (n−2)th compressed data to output the (n−2)th decompressed data during the n-th frame, and the second decoder decompresses the (n−1)th compressed data to output the (n−1)th decompressed data during the n-th frame. The coder-decoder compresses the n-th frame data into the n-th compressed data to store the n-th compressed data in the second memory and decompresses the n-th compressed data into the n-th decompressed data during the n-th frame.

The first processor outputs a first difference value indicating a difference between the (n−2)th decompressed data and the n-th decompressed data, and the second processor outputs an (n−2)th re-decompressed data based on the first difference value and the n-th frame data. The third processor outputs a second difference value indicating a difference between the (n−1)th decompressed data and the n-th decompressed data, and the fourth processor generates an (n−1)th re-decompressed data based on the second difference value and the n-th frame data. The compensator compensates the (n−1)th re-decompressed data to output (n−1)th compensation data based on the (n−2)th re-decompressed data, the (n−1)th re-decompressed data and the n-th frame data.

In a further aspect of the present invention, a display apparatus includes a data compensating circuit, a data driving circuit, a gate driving circuit and a display part. The data compensating circuit receives n-th frame data to compensate the n-th frame data as the output data during the n-th frame. The data driving circuit converts the compensated data into a data voltage in response to a data control signal to output the data voltage. The gate driving circuit outputs a gate voltage in response to a gate control signal. The display part displays an image in response to the data voltage and the gate voltage.

The data compensating circuit includes a first memory, a second memory, a coder, a comparator, a decoder, a compensator and a data selector.

The (n−2)th compressed data compressed from the (n−2)th frame data is previously stored in the first memory and the (n−1)th compressed data compressed from the (n−1)th frame data is previously stored in the second memory. The coder converts the n-th frame data into the n-th compressed data during the n-th frame, and the comparator compares the (n−2)th compressed data, the (n−1)th compressed data and the n-th compressed data with each other to output a selection signal.

The decoder decompresses the n-th compressed data, the (n−1)th compressed data and the (n−2)th compressed data into the n-th decompressed data, the (n−1)th decompressed data and the (n−2)th decompressed data, respectively. The compensator outputs a first compensation data based on the n-th decompressed data, the (n−1)th decompressed data and the (n−2)th decompressed data, and the data selector outputs either the n-th frame data or the first compensation data as the output data in response to the selection signal.

According to the above, since the compressed data is stored in the memory, the size of the memory may be reduced. Also, in case of displaying a freeze-frame image, the present frame data that is neither compressed nor decompressed is output, thereby preventing damage of data.

BRIEF DESCRIPTION OF THE DRAWINGS

The above and other advantages of the present invention will become readily apparent by reference to the following detailed description when considered in conjunction with the accompanying drawings, wherein.

DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be explained in detail with reference to the accompanying drawings.

Figure 1:
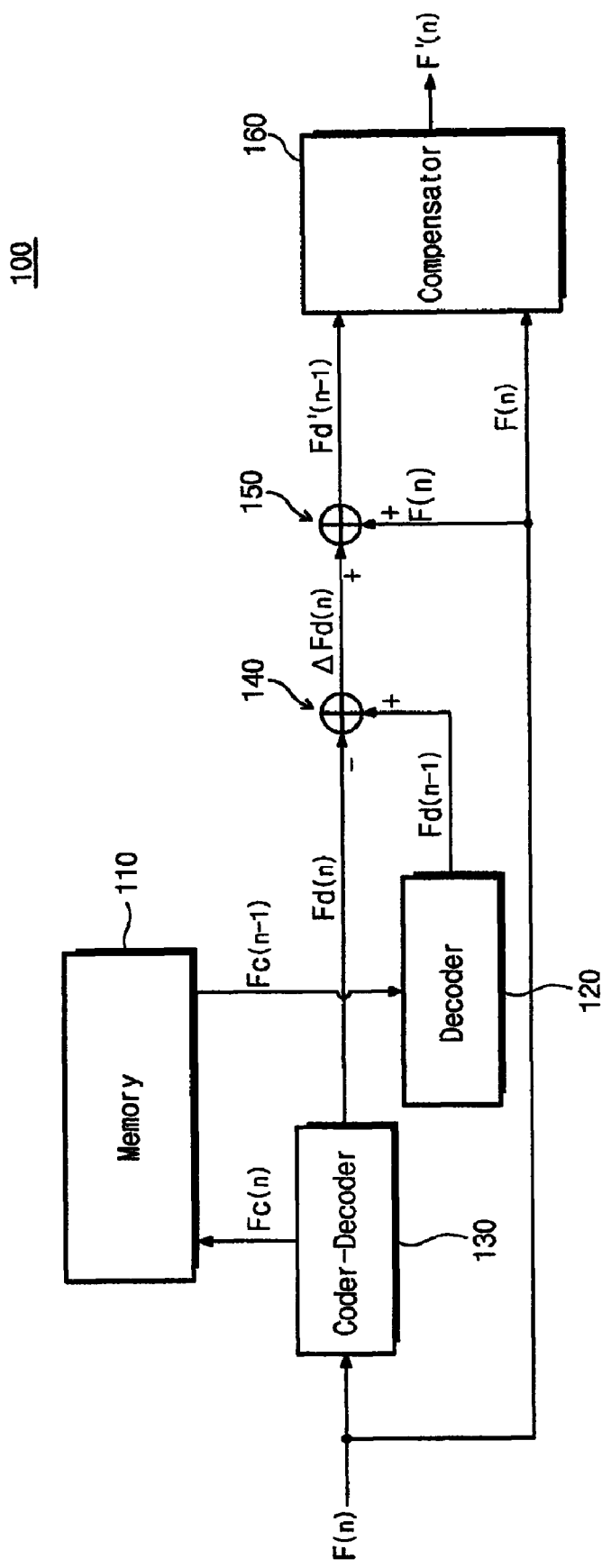
FIG. 1 is a block diagram showing an exemplary embodiment of a data compensating circuit according to the present invention.

FIG. 1 is a block diagram showing an exemplary embodiment of a data compensating circuit according to the present invention.

Referring to FIG. 1, a data compensating circuit 100 includes a memory 110, a decoder 120, a coder-decoder 130, a first processor 140, a second processor 150 and a compensator 160.

In the memory 110, data Fc(n−1) compressed from a previous frame F(n−1) is previously stored. In the present embodiment, if the previous frame data F(n−1) includes 24 bits, the previous compressed data Fc(n−1) includes 8 bits that are compressed into one-third of the previous frame data F(n−1). Thus, the memory 110 is smaller than $2^m$ (m represents a number of bits of the previous frame data F(n−1)). That is, when the previous frame data F(n−1) includes 24 bits, the memory 110 has a size of $2^8$. Likewise, compressed data having a data amount less than one frame amount is stored in the memory 110, so that the size of the memory 110 may be reduced.

The decoder 120 reads out the previous compressed data Fc(n−1) that is previously stored in the memory 110 and decompresses the previous compressed data Fc(n−1) to output a previous decompressed data Fd(n−1) during a present frame. Particularly, the decoder 120 decompresses the previous compressed data Fc(n−1) of m/3 bits into the previous decompressed data Fd(n−1) of m bits.

The coder-decoder 130 receives present frame data F(n) and compresses the present frame data F(n) into present compressed data Fc(n) to store the present compressed data Fc(n) in the memory 110 during the present frame. The present frame data F(n) includes m bits and the present compressed data Fc(n) includes m/3 bits. The coder-decoder 130 decompresses the present compressed data Fc(n) to output a present decompressed data Fd(n) during the present frame.

The first processor 140 outputs a first difference value ΔFd(n) between the previous decompressed data Fd(n−1) and the present decompressed data Fd(n), and the second processor 150 generates a previous re-decompressed data Fd'(n−1) based on the first difference value ΔFd(n) and the present frame data F(n). Particularly, the second processor 150 adds the first difference value ΔFd(n) to the present frame data F(n) to generate the previous re-decompressed data Fd'(n−1). For a freeze-frame image, the present decompressed data Fd(n) is identical to the previous decompressed data Fd(n−1), so that the first difference value ΔFd(n) is equal to zero. Thus, the second processor 150 may output the previous re-decompressed data Fd'(n−1) that is identical to the present frame data F(n).

The compensator 160 compensates the present frame data F(n) based on the previous re-decompressed data Fd'(n−1) and the present frame data F(n) to output a present compensation data F'(n). Particularly, the compensator 160 outputs the present compensation data F'(n) that is identical to the present frame data F(n) when a second difference value between the previous re-decompressed data Fd'(n−1) and the present frame data F(n) is smaller than a predetermined first reference value. Thus, for a freeze-frame image, the first difference value ΔFd(n) is equal to zero, so that the previous re-decompressed data Fd'(n−1) is identical to the present frame data F(n).

During the present frame, the present frame data F(n) that is neither compressed nor decompressed is output. Thus, the present frame data F(n) that is not processed is used to display an image, thereby preventing damage of the freeze-frame image.

The compensator 160 outputs the present compensation data F'(n) which is increased by a predetermined compensated value over the present frame data F(n) when the second difference value is larger than the first reference value.

Hereinafter, the present compensation data that is overdriven (increased or decreased) by the compensator 160 will be described in detail with reference to FIGS. 2 and 3.

Figure 2:
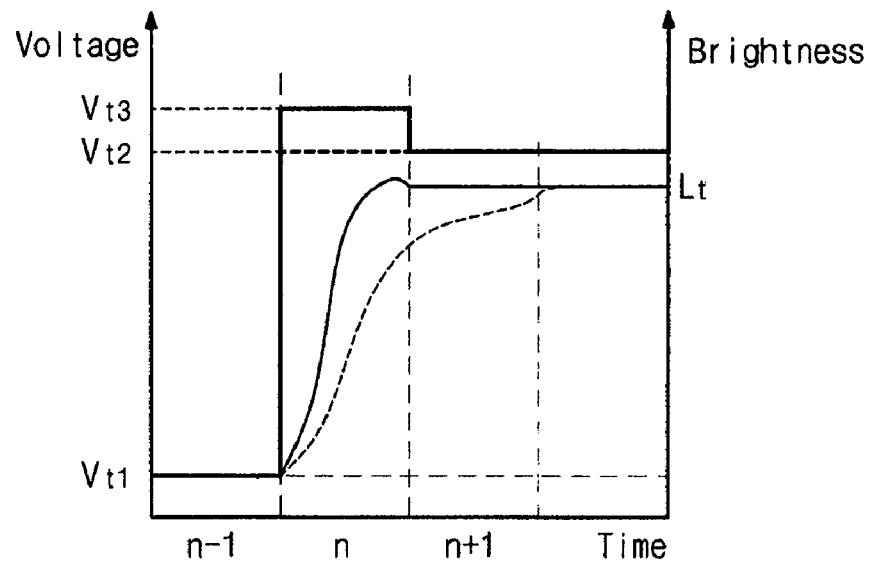
FIGS. 2 and 3 are graphs showing brightness and voltage corresponding to a present frame compensated by a data compensating circuit shown in FIG. 1.
Figure 3:
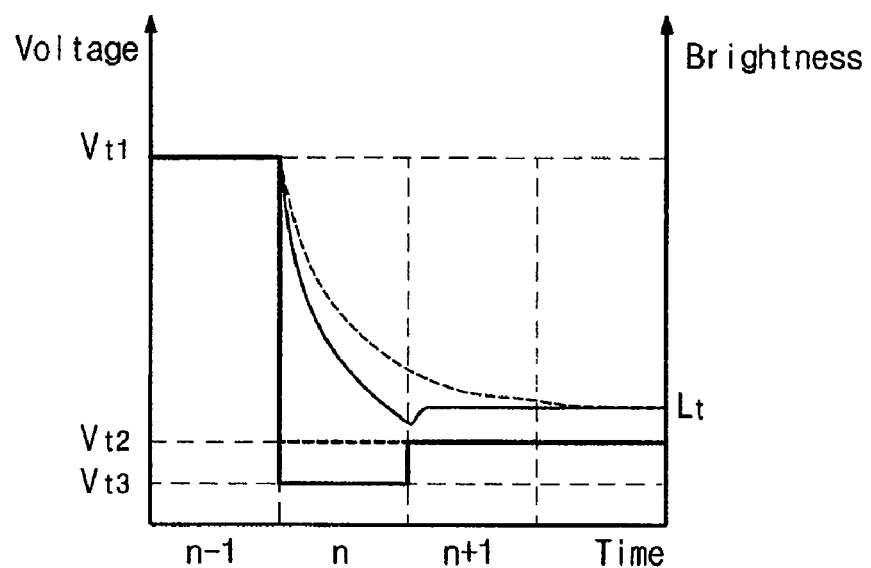

FIGS. 2 and 3 are graphs showing brightness and voltage corresponding to the present compensation data compensated by the data compensating circuit shown in FIG. 1. In FIGS. 2 and 3, x axis represents time and y axis represent voltage and brightness. The voltage represents a voltage applied to the liquid crystal layer at every frame, and the brightness represents brightness of light that passes through the liquid crystal layer.

Referring to FIG. 2, the previous frame data corresponds to a first target voltage Vt1 and the present frame data corresponds to a second target voltage Vt2 that is higher than the first target voltage Vt1. When the voltage difference between the first target voltage Vt1 and the second target voltage Vt2 is larger than the predetermined reference value, the desired target brightness Lt may not be obtained within one frame even though the second target voltage Vt2 is applied to the liquid crystal layer. In order to solve the problem, the compensator 160 (shown in FIG. 1) overdrives (increases) the second target voltage Vt2 to a third target voltage Vt3 that is higher than the second target voltage Vt2 during the present frame n. Thus, the third target voltage Vt3 is applied to the liquid crystal layer during the present frame n, so that the rising time of the voltage for the liquid layer may be reduced and the desired target brightness Lt may be obtained within one frame.

Referring to FIG. 3, the previous frame data corresponds to the first target voltage Vt1 and the present frame data corresponds to the second target voltage Vt2 that is lower than the first target voltage Vt1. When the voltage difference between the first target voltage Vt1 and the second target voltage Vt2 is larger than the predetermined reference value, the desired target brightness Lt may not be obtained within one frame even though the second target voltage Vt2 is applied to the liquid crystal layer. In order to solve the problem, the compensator 160 (shown in FIG. 1) overdrives (decreases) the second target voltage Vt2 to the third target voltage Vt3 that is lower than the second target voltage Vt2 during the present frame n. Thus, the third target voltage Vt3 is applied to the liquid crystal layer during the present frame n, so that the falling time of the voltage for the liquid crystal layer may be reduced and desired target brightness Lt may be obtained within one frame.

As described above, the overdriven (increased or decreased) voltage is applied to the liquid crystal layer, thereby improving the response speed of the liquid crystal molecules of the liquid crystal layer.

Figure 4:
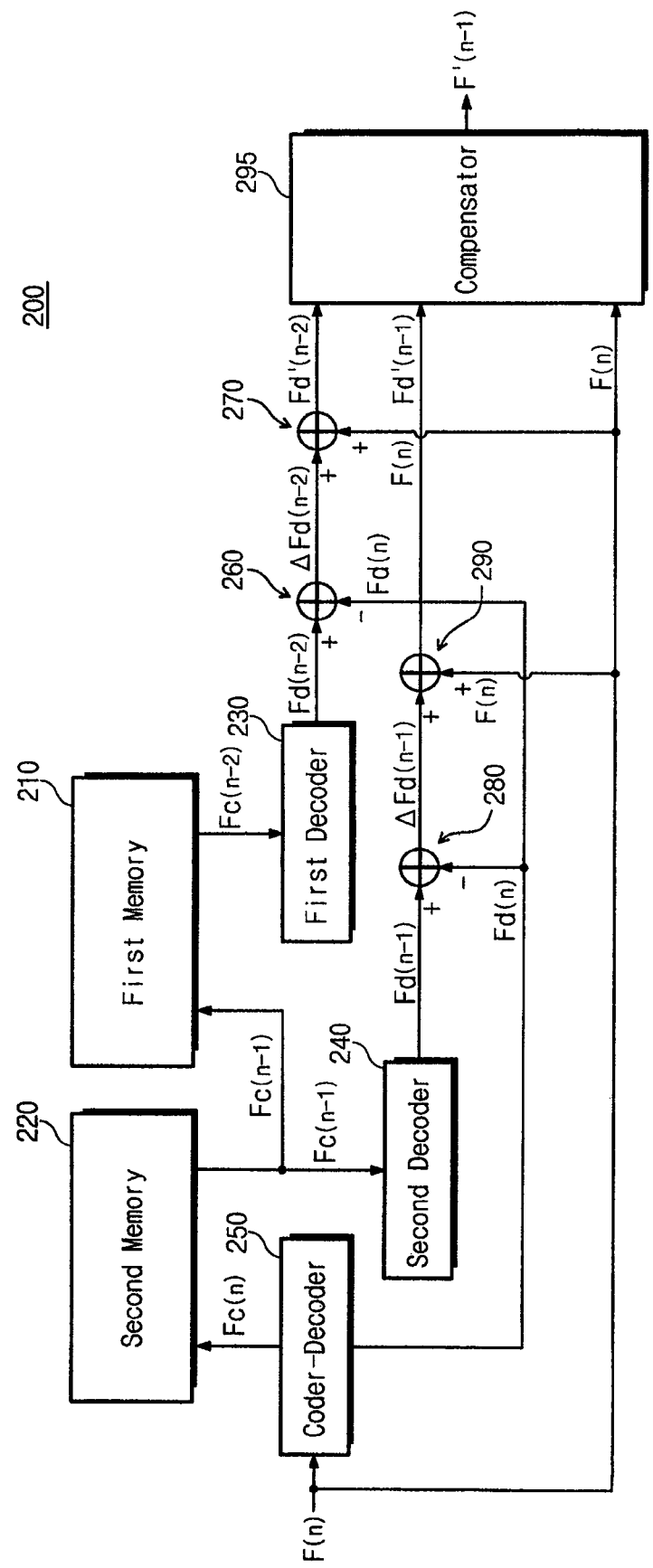
FIG. 4 is a block diagram showing another exemplary embodiment of a data compensating circuit according to the present invention.
Figure 5:
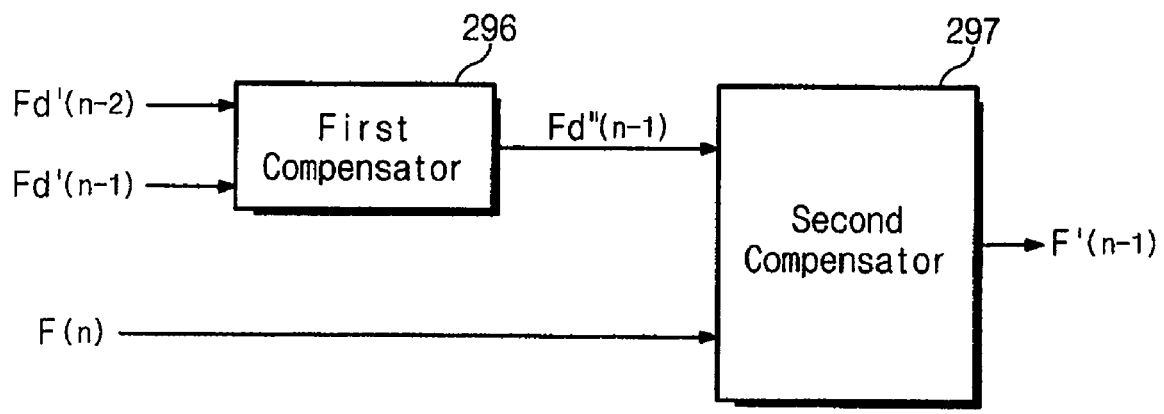
FIG. 5 is an inner block diagram of a compensator shown in FIG. 4.

FIG. 4 is a block diagram showing another exemplary embodiment of a data compensating circuit according to the present invention and FIG. 5 is an inner block diagram of the compensator shown in FIG. 4.

Referring to FIG. 4, a data compensating circuit 200 includes a first memory 210, a second memory 220, a first decoder 230, a second decoder 240, a coder-decoder 250, a first processor 260, a second processor 270, a third processor 280, a fourth processor 290 and a compensator 295.

In the first memory 210, (n−2)th compressed data Fc(n−2) from the (n−2)th frame data F(n−2) is previously stored, and the (n−1)th compressed data Fc(n−1) from an (n−1)th frame data F(n−1) is previously stored in the second memory 220. The first memory 210 outputs the previously stored (n−2)th compressed data Fc(n−2) during an n-th frame and stores the (n−1)th compressed data Fc(n−1). The second memory 220 outputs the previously stored (n−1)th compressed data Fc(n−1) during the n-th frame. In the present embodiment, if each of the (n−2)th and (n−1)th frame data includes m bits, each of the (n−2)th and (n−1)th compressed data includes m/3 bits. Each of the first and second memories 210 and 220 is smaller than $2^m$. As an example of the present embodiment, each of the first and second memories 210 and 220 has a size of about $2^{m/3}$.

The first decoder 230 decompresses the (n−2)th compressed data Fc(n−2) to output (n−2)th decompressed data Fd(n−2) during the n-th frame, and the second decoder 240 decompresses the (n−1)th compressed data Fc(n−1) to output (n−1)th decompressed data Fd(n−1) during the n-th frame. In the present embodiment, the first and second decoders 230 and 240 decompress the (n−2)th and (n−1)th compressed data Fc(n−2) and Fc(n−1) of m/3 bits into (n−2)th and (n−1)th decompressed data Fd(n−2) and Fd(n−1) of m bits, respectively.

The coder-decoder 250 receives n-th frame data F(n) during the n-th frame and compresses the n-th frame data F(n) into the n-th compressed data Fc(n) to provide the n-th compressed data Fc(n) to the second memory 220. The coder-decoder 250 decompresses the n-th compressed data Fc(n) to output n-th decompressed data Fd(n) during the n-th frame.

The first processor 260 outputs a first difference value ΔFd(n−2) between the (n−2)th decompressed data Fd(n−2) and the n-th decompressed data Fd(n), and the second processor 270 generates (n−2)th re-decompressed data Fd'(n−2) based on the first difference value ΔFd(n−2) and the n-th frame data F(n). The second processor 270 adds the first difference value ΔFd(n−2) to the n-th frame data F(n) to generate the (n−2)th re-decompressed data Fd'(n−2).

The third processor 280 outputs a second difference value ΔFd(n−1) between the (n−1)th decompressed data Fd(n−1) and the n-th decompressed data Fd(n), and the fourth processor 290 generates (n−1)th re-decompressed data Fd'(n−1) based on the second difference value ΔFd(n−1) and the n-th frame data F(n). The fourth processor 290 adds the second difference value ΔFd(n−1) to the n-th frame data F(n) to generate the (n−1)th re-decompressed data Fd'(n−1).

The compensator 295 compensates the (n−1)th re-decompressed data Fd'(n−1) based on the (n−2)th re-decompressed data Fd'(n−2), the (n−1)th re-decompressed data Fd'(n−1) and the n-th frame data F(n) to output (n−1)th compensation data F'(n−1).

As shown in FIG. 5, the compensator 295 includes a first compensator 296 and a second compensator 297. The first compensator 296 generates (n−1)th compensation decompressed data Fd"(n−1) based on the (n−2)th re-decompressed data Fd'(n−2) and the (n−1)th re-decompressed data Fd"(n−1). The second compensator 297 generates the (n−1)th compensation data F'(n−1) based on the (n−1)th compensation decompressed data Fd"(n−1) and the n-th frame data F(n).

Particularly, the first compensator 296 outputs the (n−1)th compensation decompressed data Fd"(n−1) that is identical to the (n−2)th re-decompressed data Fd'(n−2) when a third difference value between the (n−2)th re-decompressed data Fd'(n−2) and the (n−1)th re-decompressed data Fd'(n−1) is smaller than a predetermined first reference value, and outputs the (n−1)th compensation decompressed data Fd"(n−1) that is overdriven from the (n−1)th re-decompressed data Fd'(n−1) when the third difference value is larger than the predetermined first reference value.

For a freeze-frame image, each of the first and second difference values ΔFd(n−2) and ΔFd(n−1) is equal to zero, so that each of the (n−2)th and (n−1)th re-decompressed data Fd'(n−2) and Fd'(n−1) is identical to the n-th frame data F(n). Also, the third difference value is equal to zero, the first compensator 296 outputs the (n−1)th compensation decompressed data Fd"(n−1) that is identical to the n-th frame data F(n).

Meanwhile, the second compensator 297 generates (n−1)th compensation data F'(n−1) that is larger by a second compensated value than the (n−1)th compensation decompressed data Fd"(n−1) when the (n−1)th compensation decompressed data Fd"(n−1) is smaller than a second reference value and the n-th frame data F(n) is larger than a third reference value. The second compensator 297 generates the (n−1)th compensation data F'(n−1) that is identical to the (n−1)th compensation decompressed data Fd"(n−1) when the (n−1)th compensation decompressed data Fd"(n−1) is larger than the second reference value or the n-th frame data F(n) is smaller than the third reference value.

For a freeze-frame image, the second compensator 297 generates the (n−1)th compensation data F'(n−1) that is identical to the (n−1)th compensation decompressed data Fd"(n−1). Since the (n−1)th compensation decompressed data Fd"(n−1) is identical to the n-th frame data F(n), the (n−1)th compensation data F'(n−1) is equal to the n-th frame data F(n).

Likewise, when displaying the freeze-frame image, each of the first and second compensators 296 and 297 output the n-th frame data F(n) that is neither compressed nor decompressed. Thus, the n-th frame data F(n) that is not processed is used to display an image, thereby preventing damage of the freeze-frame image.

Figure 6:
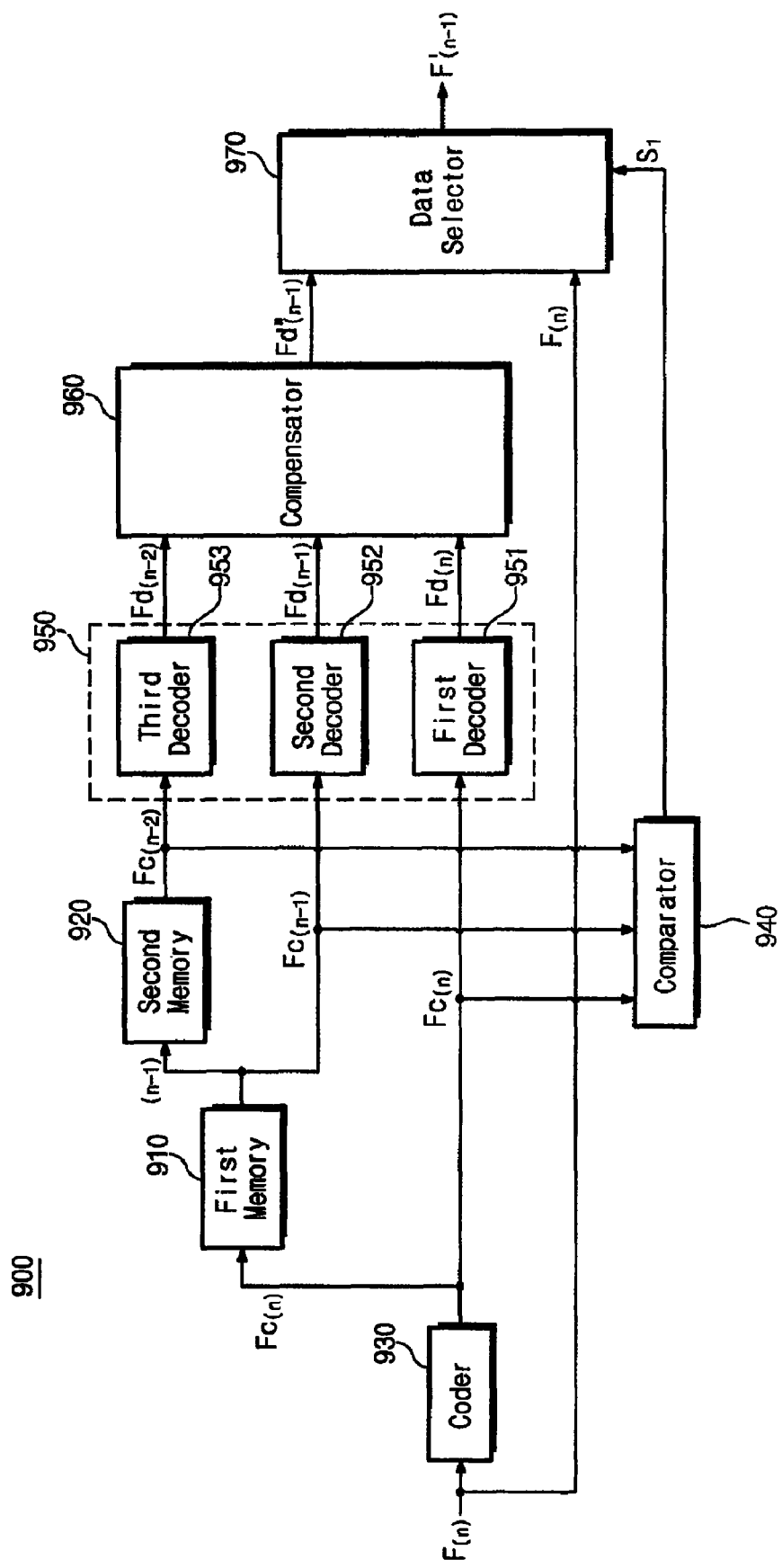
FIG. 6 is a block diagram showing another exemplary embodiment of a data compensating circuit according to the present invention.
Figure 7:
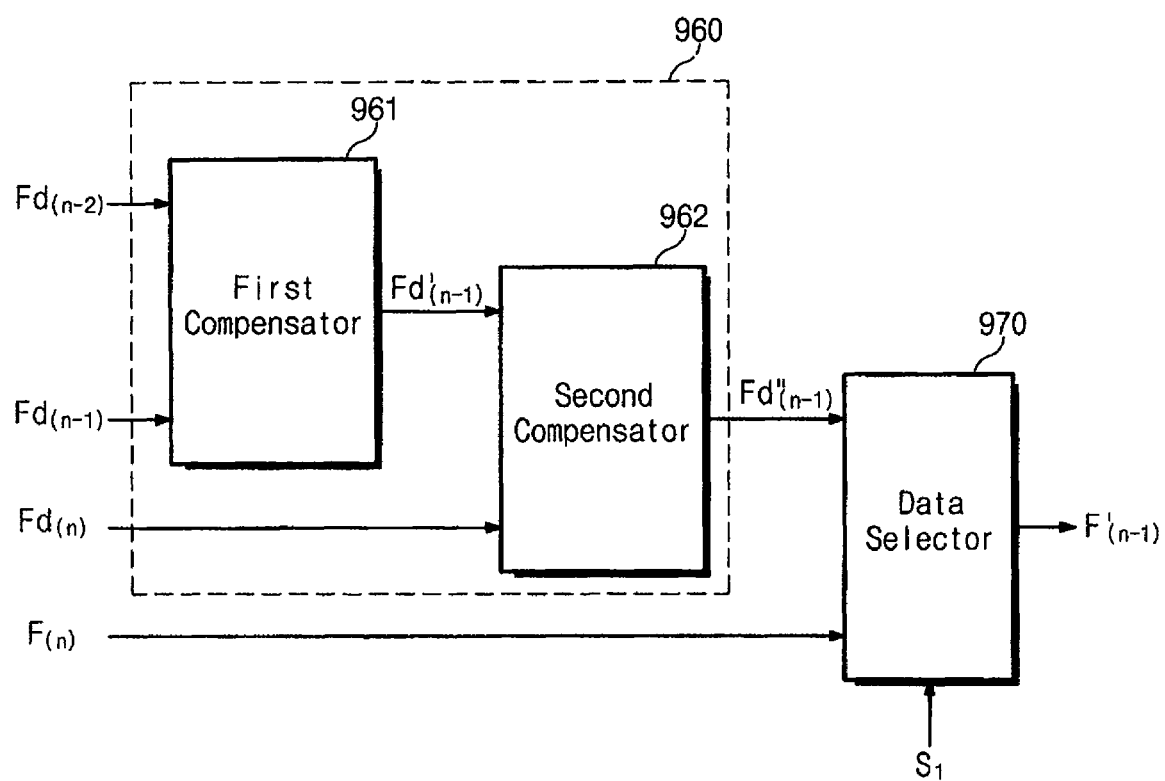
FIG. 7 is an inner block diagram of a compensator shown in FIG. 6.

FIG. 6 is a block diagram showing another exemplary embodiment of a data compensating circuit according to the present invention and FIG. 7 is an inner block diagram of a compensator shown in FIG. 6.

Referring to FIG. 6, a data compensating circuit 900 includes a first memory 910, a second memory 920, a coder 930, a comparator 940, a decoder 950, a compensator 960 and a data selector 970.

In the first memory 910, (n−1)th compressed data Fc(n−1) compressed from the (n−1)th frame data F(n−1) is previously stored, and (n−2)th compressed data Fc(n−2) compressed from the (n−2)th frame data F(n−2) is previously stored in the second memory 920. Each of the first and second memories 910 and 920 is smaller than $2^{m/i}$ (m represents a number of bits of the (n−1)th and (n−2)th frame data F(n−1) and F(n−2) and i represents a value obtained by dividing m bits by a number of bits to be compressed).

In the present embodiment, in case that the (n−1)th frame data F(n−1) includes 24 bits, the (n−1)th compressed data Fc(n−1) includes 8 bits that is compressed into one third of the (n−1)th frame data F(n−1). Thus, each of the first and second memories 910 and 920 has a size of $2^8$. Likewise, a compressed data having a data amount smaller than one frame amount is stored in each of the first and second memories 910 and 920, so that the size of the first and second memories 910 and 920 may be reduced.

The coder 930 receives n-th frame data F(n) and compresses the n-th frame data F(n) into n-th compressed data Fc(n) during the n-th frame. Each of the (n−1)th and (n−2)th compressed data Fc(n−1) and Fc(n−2) previously stored in the first memory 910 and the second memory 920, respectively, is read out during the n-th frame, and then each of the (n−1)th and (n−2)th compressed data Fc(n−1) and Fc(n−2) is stored in the first memory 910 and the second memory 920, respectively.

The comparator 940 receives the n-th compressed data Fc(n), the (n−1)th compressed data Fc(n−1) and the (n−2)th compressed data Fc(n−2) from the coder 930, the first memory 910 and the second memory 920, respectively. The comparator 940 outputs a selection signal S1 having a first state when the n-th compressed data Fc(n) is identical to the (n−1)th and (n−2)th compressed data Fc(n−1) and Fc(n−2). Also, the comparator 940 outputs the selection signal S1 having a second state when the n-th compressed data Fc(n) is different from the (n−1)th compressed data Fc(n−1) and (n−2)th compressed data Fc(n−2) and the (n−1)th compressed data Fc(n−1) is identical to the (n−2)th compressed data Fc(n−2).

The decoder 950 includes a first decoder 951, a second decoder 952 and a third decoder 953. The first decoder 951 receives the n-th compressed data Fc(n) from the coder 930 and decompresses the n-th compressed data Fc(n) into an n-th decompressed data Fd(n) to output the n-th decompressed data Fd(n). The second decoder 952 receives the (n−1)th compressed data Fc(n−1) and decompresses the (n−1)th compressed data Fc(n−1) into (n−1)th decompressed data Fd(n−1) to output the (n−1)th decompressed data Fd(n−1). The third decoder 953 receives the (n−2)th compressed data Fc(n−

2) and decompresses the (n−2)th compressed data into (n−2)th decompressed data Fd(n−2) to output the (n−2)th decompressed data Fd(n−2).

The compensator 960 receives the n-th, (n−1)th and (n−2)th decompressed data Fd(n), Fd(n−1) and Fd(n−2) from the first, second and third decoders 951, 952 and 953, respectively. The compensator 960 outputs first compensation data Fd"(n−1) based on the n-th, (n−1)th and (n−2)th decompressed data Fd(n), Fd(n−1) and Fd(n−2).

The data selector 970 receives the first compensation data Fd"(n−1), the n-th frame data F(n) and the selection signal S1 from the comparator 940 to output data F'(n−1). Particularly, the data selector 970 outputs the n-th frame data F(n) as the output data F'(n−1) when the selection signal S1 having the first state is input. The data selector 970 outputs the first compensation data Fd"(n−1) as the output data F'(n−1) when the selection signal S1 having the second state is input.

As shown in FIG. 7, the compensator 960 includes a first compensator 961 and a second compensator 962.

The first compensator 961 outputs second compensation data Fd'(n−1) based on the (n−1)th decompressed data Fd(n−1) and the (n−2)th decompressed data Fd(n−2). The second compensator 962 outputs the first compensation data Fd"(n−1) based on the second compensation data Fd'(n−1) and the n-th decompressed data Fd(n).

The first compensator 961 outputs the (n−1)th decompressed data Fd(n−1) when the difference between the (n−2)th decompressed data Fd(n−2) and the (n−1)th decompressed data Fd(n−1) is smaller than a predetermined reference value. First compensator 961 outputs the second compensation data Fd'(n−1) that is increased by a predetermined compensated value over the (n−1)th decompressed data Fd(n−1) when the difference value is larger than the reference value.

The second compensator 962 receives the second compensation data Fd'(n−1) and the n-th decompressed data Fd(n) to output first compensation data Fd"(n−1). As an example of the present embodiment, the first compensation data Fd"(n−1) has an intermediate value between the second compensation data Fd'(n−1) and the n-th decompressed data Fd(n).

According to another embodiment of the present invention, the data compensating circuit 900 further includes a look up table (LUT, not shown) having predetermined compensation data according to the values of the second compensation data Fd'(n−1) and the n-th decompressed data Fd(n). Thus, the second compensator 962 may output a compensation data based on the second compensation data Fd'(n−1) and the n-th decompressed data Fd(n) from the LUT as the first compensation data Fd"(n−1).

The data selector 970 outputs either the first compensation data Fd"(n−1) or the n-th frame data F(n) as the output data F'(n−1) according to the state of the selection signal S1.

Thus, for displaying a freeze-frame image, the data compensating circuit 900 outputs the n-th frame data F(n) that is not compressed, thereby preventing damage of data. Also, when the freeze-frame image is converted into a moving image, the data compensating circuit 900 outputs an intermediate value based on data from the freeze-frame image and data of the moving image, thereby preventing damage of the data at the conversion moment.

Figure 8:
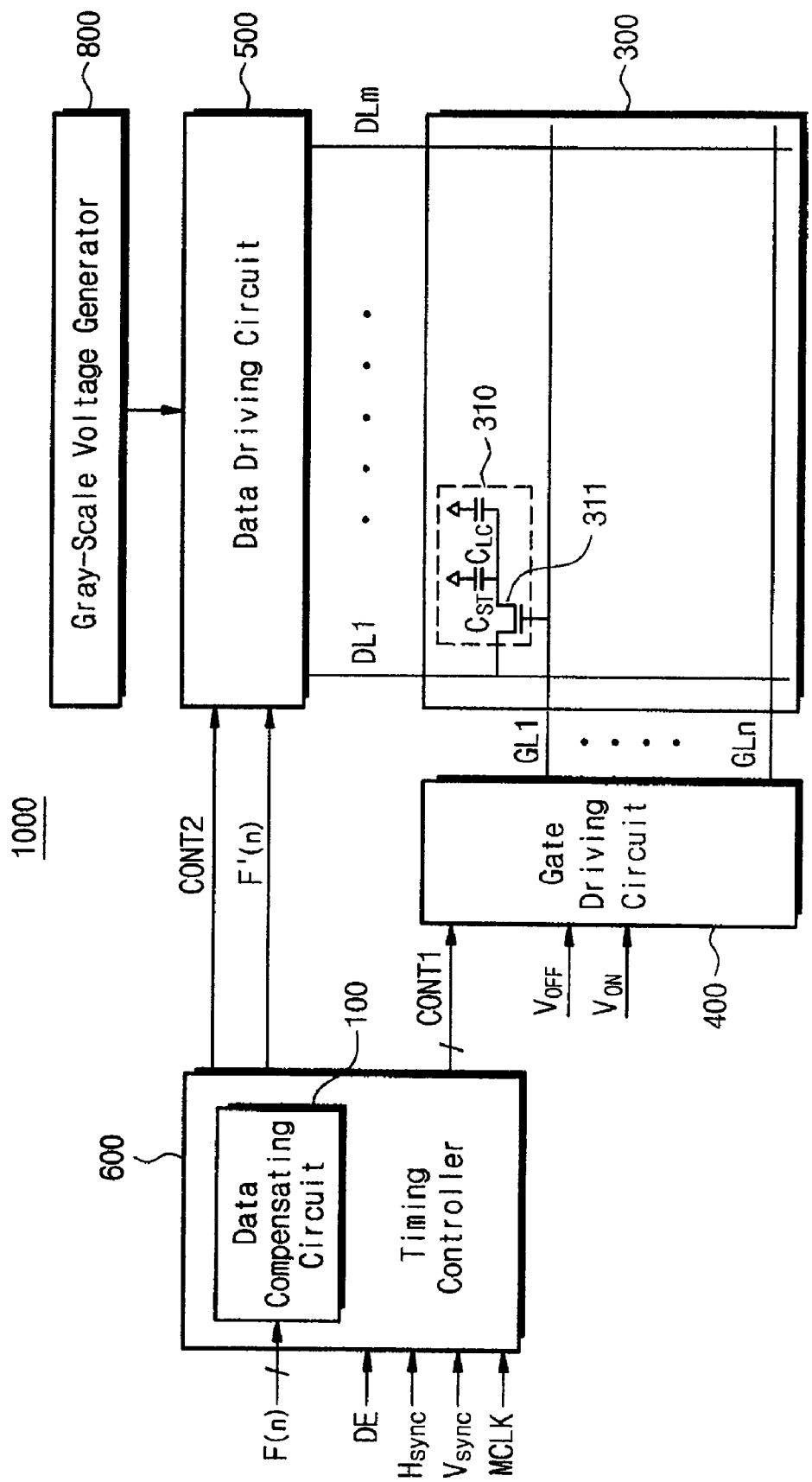
FIG. 8 is a block diagram showing a liquid crystal display apparatus having the data compensating circuit shown in FIG. 1.

FIG. 8 is a block diagram showing a liquid crystal display apparatus having the data compensating circuit shown in FIG. 1.

Referring to FIG. 8, a liquid crystal display apparatus 1000 includes a display part 300 displaying an image, a gate driving circuit 400 and a data driving circuit 500 driving the display part 300, a gray-scale voltage generator 800 connected to the data driving circuit 500 and a timing controller 600 controlling the drive of the gate driving circuit 400 and the data driving circuit 500.

A plurality of gate lines GL1~GLn receiving a gate voltage and a plurality of data lines DL1~DLm receiving a data voltage are arranged on the display part 300. The gate lines GL1~GLn and the data lines DL1~DLm define a plurality of pixel areas in a matrix configuration and a pixel 310 is arranged in each pixel areas. The pixel 310 includes a thin film transistor 311, a liquid crystal capacitor $C_{LC}$ and a storage capacitor CST.

As shown in FIG. 8, the thin film transistor 311 includes a gate electrode connected to a first gate line GL1, a source electrode connected to a first data line DL1 and a drain electrode connected in parallel to the liquid crystal capacitor $C_{LC}$ and the storage capacitor CST.

In the present embodiment, the display part 300 includes a lower substrate, an upper substrate facing the lower substrate and a liquid crystal layer interposed between the lower substrate and the upper substrate.

The gate lines GL1~GLn, the data lines DL1~DLm, the thin film transistor 311 and pixel electrodes that serve as a first electrode of the liquid crystal capacitor $C_{LC}$ are formed onto the lower substrate. Thus, the thin film transistor 311 applies the data voltage to the pixel electrodes in response to the gate voltage.

A common electrode that serves as the second electrode of the liquid crystal capacitor $C_{LC}$ is formed onto the upper substrate, and a common voltage is applied to the common electrode. The liquid crystal layer interposed between the pixel electrode and the common electrode serves as the dielectric. Therefore, a voltage corresponding to the electric potential difference between the data voltage and the common voltage is charged into the liquid crystal capacitor $C_{LC}$.

The gate driving circuit 400 is electrically connected to the gate lines GL1~GLn arranged on the display part 300 to provide the gate voltage to the gate lines GL1~GLn. The data driving circuit 500 is electrically connected to the data lines DL1~DLm arranged on the display part 300 and selects a gray-scale voltage from the gray-scale voltage generator 800 to provide the gray-scale voltage to the data lines DL1~DLm as the data voltage.

The timing controller 600 receives various control signals, such as a vertical synchronization signal Vsync, a horizontal synchronization signal Hsync, a main clock MCLK, a data enable signal DE, etc. The timing controller 600 outputs a gate control signal CONT1 and a data control signal CONT2 based on the various control signals.

The gate control signal CONT1 is provided to the gate driving circuit 400 to control the drive of the gate driving circuit 400. The gate control signal CONT1 includes a vertical start signal starting the drive of the gate driving circuit 400, a gate clock signal determining an output time of the gate voltage and an output enable signal determining an ON pulse width of the gate voltage.

The gate driving circuit 400 outputs the gate voltage as a gate-on voltage Von or a gate-off voltage Voff in response to the gate control signal CONT1 from the timing controller 600.

The data control signal CONT2 is provided to the data driving circuit 500 as a signal to control the drive of the data driving circuit 500. The data control signal CONT2 includes a horizontal start signal that starts the driving of the data driving circuit 500, a converting signal that converts the polarity of the data voltage, an output indication signal that determines an output time of the data voltage from the data driving circuit 500.

The timing controller 600 is formed in a chip-shape, and the data compensating circuit 100 shown in FIG. 1 is built in the timing controller 600. Particularly, the compressed data is stored in the memory 110 (shown in FIG. 1), so that the size of the memory 110 may be reduced and the memory 110 may be built in the timing controller 600.

The data compensating circuit 100 receives the present frame data F(n) from an external graphic controller (not shown) and compensates the present frame data F(n) into the present compensation data F'(n) during the present frame. The data driving circuit 500 receives the present compensation data F'(n) in response to the data control signal CONT1 from the timing controller 600 and selects the gray-scale voltage corresponding to the present compensation data F'(n) among gray-scale voltages from the gray-scale voltage generator 800. Then, the data driving circuit 500 converts the selected gray-scale voltage into the data voltage to output the data voltage.

Thus, the display part 300 displays the image in response to the data voltage and the gate voltage. Particularly, in case of the freeze-frame image, the present compensation data F'(n) is changed into the data voltage corresponding to the present frame data F(n) that is neither compressed nor decompressed, so that the display part 300 may display the image using the data that is not damaged.

According to the above, the frame data is compressed and stored in the memory, and the compressed frame data that is read out from the memory is provided to the compensator after decompressing the read out frame data. Thus, the size of the memory may be reduced and the memory may be built in the timing controller, thereby decreasing the cost of manufacture and increasing productivity. Further, in case of displaying the freeze-frame image, the present frame data that is neither compressed nor decompressed is used to display the image, thereby preventing damage of data.

The data driving circuit compares compressed data corresponding to three consecutive frames with each other and outputs the present frame data that is not compressed or outputs the intermediate value between the present frame data and the first compensation data according to the result of comparison. Thus, the display apparatus may improve the response speed and prevent damage of data due to the compression.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A data compensating circuit comprising:
   a memory storing previous compressed data, into which previous frame data is compressed;
   a decoder decompressing the previous compressed data that is read out from the memory to output previous decompressed data during a present frame;
   a coder-decoder compressing present frame data into present compressed data to store the present compressed data in the memory and decompressing the present compressed data to output present decompressed data during the present frame;
   a first processor outputting a first difference value indicating a difference between the previous decompressed data and the present decompressed data;
   a second processor outputting previous re-decompressed data based on the first difference value and the present frame data; and
   a compensator compensating the present frame data based on the previous re-decompressed data and the present frame data to output present compensation data.

2. The data compensating circuit of claim 1, wherein the previous re-decompressed data is the sum of the present frame data and the first difference value.

3. The data compensating circuit of claim 2, wherein the compensator outputs the present compensation data having the same value as the present frame data when a second difference value indicating a difference between the previous re-decompressed data and the present frame data is smaller than a predetermined first reference value, and outputs the present compensation data increased by a predetermined compensated value compared to the present frame data when the second difference value is larger than the first reference value.

4. The data compensating circuit of claim 3, wherein the second processor outputs the previous re-decompressed data identical to the present frame data when the first difference value is equal to zero, and the present compensation data is identical to the present frame data.

5. The data compensating circuit of claim 1, wherein the memory has a size that is smaller than $2^m$ (m represents a number of bits of the present frame data).

6. The data compensating circuit of claim 5, wherein the memory has a size of $2^{m/3}$.

7. The data compensating circuit of claim 6, wherein the decoder decompresses the previous compressed data of m/3 bits into the previous decompressed data of m bits, and the coder-decoder compresses the present frame data of m bits into the present compressed data of m/3 bits.

8. A data compensating circuit comprising:
   a first memory in which (n−2)th data compressed from (n−2)th frame data (n represents a present frame) is previously stored;
   a second memory in which (n−1)th data compressed from (n−1)th frame data is previously stored;
   a first decoder decompressing the (n−2)th compressed data to output an (n−2)th decompressed data during an n-th frame;
   a second decoder decompressing the (n−1)th compressed data to output (n−1)th decompressed data during the n-th frame;
   a coder-decoder compressing the n-th frame data into n-th compressed data to provide the n-th compressed data to the second memory during the n-th frame, and decompressing the n-th compressed data to output n-th decompressed data;
   a first processor outputting a first difference value indicating a difference between the (n−2)th decompressed data and the n-th decompressed data;
   a second processor outputting (n−2)th re-decompressed data based on the first difference value and the n-th frame data;
   a third processor outputting a second difference value indicating a difference between the (n−1)th decompressed data and the n-th decompressed data;
   a fourth processor outputting an (n−1)th re-decompressed data based on the second difference value and the n-th frame data; and
   a compensator compensating the (n−1)th re-decompressed data based on the (n−2)th re-decompressed data, the (n−1)th re-decompressed data and the n-th frame data to output (n−1)th compensation data.

9. The data compensating circuit of claim 8, wherein the (n−2)th re-decompressed data is the sum of the n-th frame data and the first difference value, and the (n−1)th re-decompressed data is the sum of the n-th frame data and the second difference value.

10. The data compensating circuit of claim 8, wherein each of the first and second memories is smaller than $2^m$ (m represents a number of bits of the n-th frame data).

11. The data compensating circuit of claim 10, wherein each of the first and second memories has a size of $2^{m/3}$.

12. A data compensating circuit comprising:
   a first memory in which (n−2)th data compressed from (n−2)th frame data (n represents a present frame) is previously stored;
   a second memory in which (n−1)th data compressed from (n−1)th frame data is previously stored;
   a coder converting n-th frame data into n-th compressed data during an n-th frame;
   a comparator comparing the (n−2)th compressed data, the (n−1)th compressed data and the n-th compressed data with each other to output a selection signal;
   a decoder decompressing the n-th compressed data, the (n−1)th compressed data and the (n−2)th compressed data into n-th decompressed data, (n−1)th decompressed data and (n−2)th decompressed data, respectively;
   a compensator outputting first compensation data based on the n-th decompressed data, the (n−1)th decompressed data, and the (n−2)th decompressed data; and
   a data selector outputting either the n-th frame data or the first compensation data as output data thereof in response to the selection signal.

13. The data compensating circuit of claim 12, wherein the compensator comprises:
   a first compensator outputting second compensation data based on the (n−1)th decompressed data and the (n−2)th decompressed data; and
   a second compensator outputting first compensation data based on the second compensation data and the n-th decompressed data.

14. The data compensating circuit of claim 13, wherein the second compensator outputs an intermediate value between the second compensation data and the n-th decompressed data as the first compensation data.

15. The data compensating circuit of claim 13, wherein the first compensator outputs the (n−1)th decompressed data when a difference value indicating a difference between the (n−2)th decompressed data and the (n−1)th decompressed data is smaller than a predetermined reference value, and outputs the second compensation data increased by a predetermined compensated value compared to the (n−1)th decompressed data when the difference value is larger than the predetermined reference value.

16. The data compensating circuit of claim 12, wherein the comparator outputs the selection signal having a first state when the n-th compressed data is equal to the (n−2)th compressed data and the (n−1)th compressed data, and outputs the selection signal having a second state when the n-th compressed data is different from the (n−2)th compressed data and the (n−1)th compressed data.

17. The data compensating circuit of claim 16, wherein the data selector outputs the n-th frame data as the output data in response to the selection signal having the first state, and outputs the first compensation data as the output data in response to the selection signal having the second state.

18. The data compensating circuit of claim 12, wherein each of the first and second memories has a size that is smaller than $2^m$ (m represents a number of bits of the n-th frame data).

19. A display apparatus comprising:
   a data compensating circuit generating a present compensation data based on previous frame data and present frame data;
   a data driving circuit outputting a data voltage corresponding to the present compensation data in response to a data control signal;
   a gate driving circuit outputting a gate voltage in response to a gate control signal; and
   a display part displaying an image in response to the data voltage and the gate voltage,
   the data compensating circuit comprising:
      a memory in which previous compressed data compressed from the previous frame data is previously stored;
      a decoder decompressing the previous compressed data that is read out from the memory to output previous decompressed data during a present frame;
      a coder-decoder compressing the present frame data into present compressed data to store the present compressed data into the memory, and decompressing the present compressed data to output present decompressed data during a present frame;
      a first processor outputting a first difference value indicating a difference between the previous decompressed data and the present decompressed data;
      a second processor outputting a previous re-decompressed data based on the first difference value and the present frame data; and
      a compensator compensating the present frame data based on the previous re-decompressed data and the present frame data to output present compensation data.

20. The display apparatus of claim 19, wherein the previous re-decompressed data is the sum of the present frame data and the first difference value.

21. The display apparatus of claim 19, wherein the memory has a size that is smaller than $2^m$ (m represents a number of bits of the present frame data).

22. The display apparatus of claim 19, further comprising a timing controller that applies the data control signal and the gate control signal to the data driving circuit and the gate driving circuit, respectively, in response to an external control signal.

23. The display apparatus of claim 22, wherein the timing controller is formed in a chip-shape, and the data compensating circuit is built into the timing controller.

24. The display apparatus of claim 19, wherein the display part comprises a plurality of pixels arranged in a matrix configuration thereon, each of the pixels comprises:
   a thin film transistor outputting the data voltage in response to the gate voltage; and
   a liquid crystal capacitor charging an electric potential difference between the data voltage and a predetermined reference voltage thereinto.

25. A display apparatus comprising:
   a data compensating circuit receiving n-th frame data to compensate the n-th frame data for generating compensated data as output data during the n-th frame;
   a data driving circuit converting the compensated data into a data voltage in response to a data control signal to output the data voltage;
   a gate driving circuit outputting a gate voltage in response to a gate control signal; and
   a display part displaying an image in response to the data voltage and the gate voltage, the data compensating circuit comprising:
- a first memory in which (n−2)th compressed data compressed from (n−2)th frame data is previously stored;
- a second memory in which (n−1)th compressed data compressed from (n−1)th frame data is previously stored;
- a coder converting the n-th frame data into n-th compressed data during an n-th frame;
- a comparator comparing the (n−2)th compressed data, the (n−1)th compressed data, and the n-th compressed data with each other to output a selection signal;
- a decoder decompressing the n-th compressed data, the (n−1)th compressed data and the (n−2)th compressed data into n-th decompressed data, (n−1)th decompressed data, and (n−2)th decompressed data, respectively;
- a compensator outputting first compensation data based on the n-th decompressed data, the (n−1)th decompressed data, and the (n−2)th decompressed data; and
- a data selector outputting either the n-th frame data or the first compensation data as the output data in response to the selection signal.

26. The display apparatus of claim 25, wherein the compensator comprises:
- a first compensator outputting second compensation data based on the (n−1)th decompressed data and the (n−2)th decompressed data; and
- a second compensator outputting the first compensation data based on the second compensation data and the n-th decompressed data.

27. The display apparatus of claim 25, wherein the comparator outputs the selection signal having a first state when the n-th compressed data is equal to the (n−2)th compressed data and the (n−1)th compressed data, and outputs the selection signal having a second state when the n-th compressed data is different from the (n−2)th compressed data and the (n−1)th compressed data.

28. The display apparatus of claim 27, wherein the data selector outputs the n-th frame data as the output data in response to the selection signal having the first state, and outputs the first compensation data as the output data in response to the selection signal having the second state.

29. The display apparatus of claim 25, further comprising a timing controller that applies the data control signal and the gate control signal to the data driving circuit and the gate driving circuit, respectively, in response to a control signal from an exterior.

30. The display apparatus of claim 29, wherein the timing controller is formed in a chip-shape and the data compensating circuit is built into the timing controller.

* * * * *